(12) United States Patent
Ford et al.

(10) Patent No.: US 10,189,442 B1
(45) Date of Patent: Jan. 29, 2019

(54) REMOTE VEHICLE STARTER AND APPLIANCE ACTIVATION SYSTEM

(71) Applicants: Wilford Ford, Detroit, MI (US); Breanna Bennett, Detroit, MI (US)

(72) Inventors: Wilford Ford, Detroit, MI (US); Breanna Bennett, Detroit, MI (US)

( * ) Notice: Subject to any disclaimer, the term of this patent is extended or adjusted under 35 U.S.C. 154(b) by 246 days.

(21) Appl. No.: 15/396,350

(22) Filed: Dec. 30, 2016

(51) Int. Cl.
*B60R 25/20* (2013.01)

(52) U.S. Cl.
CPC ...... *B60R 25/209* (2013.01); *B60R 2325/101* (2013.01)

(58) Field of Classification Search
CPC .................................................. B60R 25/209
USPC ........................................................ 340/12.29
See application file for complete search history.

(56) References Cited

U.S. PATENT DOCUMENTS

| 6,028,372 | A | * | 2/2000 | West | F02N 11/0807 |
| | | | | | 123/179.2 |
| 6,147,418 | A | * | 11/2000 | Wilson | F02N 11/0811 |
| | | | | | 123/179.2 |
| 2006/0154642 | A1 | * | 7/2006 | Scannell, Jr. | A01G 9/02 |
| | | | | | 455/404.1 |
| 2013/0160732 | A1 | * | 6/2013 | Tucker | F02N 11/0807 |
| | | | | | 123/179.2 |

* cited by examiner

*Primary Examiner* — Kerri L McNally
(74) *Attorney, Agent, or Firm* — RG Patent Consulting, LLC; Rachel Gilboy

(57) ABSTRACT

The present invention is a remote vehicle starter and appliance activation system including a base unit, and a remote unit capable of communicating with a remote vehicle starting unit. The base unit can transmit a signal to the remote unit and provide power to a power outlet at a predetermined time. This allows a vehicle's engine to start and an appliance plugged into the power outlet to turn both a predetermined time. The remote unit can be recharged by a charging port connection with the base unit. The base unit can include a support bracket that is engageable with a clip of the remote unit, with the charging port connection being associated with the support bracket and the clip.

16 Claims, 3 Drawing Sheets

REMOTE VEHICLE STARTER AND APPLIANCE ACTIVATION SYSTEM

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of remote vehicle starter system and more specifically relates to a remote vehicle starter and appliance activation system.

2. Description of the Related Art

Many vehicles owners today purchase vehicles or retrofit vehicles with remote start systems that enable a user of the vehicle to remotely start an engine of the vehicle. It may be desirable to remote start the vehicle if the user wishes to have the vehicle's interior heated or cooled before the user enters the vehicle. However, in certain situations, existing remote start systems may not always remain active for an optimal amount of time, for example in light of different circumstances for various remote start events.

Generally, remote start systems start a vehicle using a handheld remote or key fob using RF signals. Remotely starting a vehicle's engine is different from a normal starting of a vehicle which requires that the user actually insert a key into the ignition of the vehicle.

In conventional remote start systems, vehicle starting apparatuses may include a smart key or a Remote Keyless Entry (RKE) and also a portable transmitter transmitting a wireless signal (e.g., an RF signal) and a receiver which is installed in the vehicle to receive the wireless signal from the portable transmitter. The receiver is communicated with a device such as a door locking system, an engine driving system for starting a vehicle or so on.

In many of the conventional system, the vehicle is only started when the remote unit is activated. However, many users forget to start their vehicle when they get up in the morning or when they wish the vehicle to be started remotely, thus defeating the purpose of the conventional remote start system.

Accordingly, it is desirable to provide improved methods and systems for controlling remote start functionality of vehicles, for example with respect to a programmed time for which the remote start is active, along with the simultaneous activation of an appliance such as, but not limited to, a coffee maker, television, etc. Furthermore, other desirable features and characteristics of the present invention will be apparent from the subsequent detailed description and the appended claims, taken in conjunction with the accompanying drawings and the foregoing technical field and background.

Ideally, a remote vehicle starting system should provide capability to remotely start a vehicle's engine using a remote unit or automatically at a programmed time in combination with activating an appliance and, yet would operate reliably and be manufactured at a modest expense. Thus, a need exists for a reliable remote vehicle starter and appliance activation system to avoid the above-mentioned problems.

BRIEF SUMMARY OF THE INVENTION

In view of the foregoing disadvantages inherent in the known remote vehicle starter art, the present invention provides a novel remote vehicle starter and appliance activation system. The general purpose of the present invention, which will be described subsequently in greater detail, is to provide a system for simultaneously remotely starting a vehicle and an appliance at a predetermined time.

To attain this, the present invention essentially includes a remote vehicle starter and appliance activation system including a base unit and a remote unit. The base unit can include at least one base unit transmitter, and at least one power outlet. The base unit can be configured to transmit at least one signal by way of the base unit transmitter at a predetermined time and to provide power to an appliance plugged into the power outlet at the predetermined time. The remote unit can include at least one remote unit receiver, and at least one remote unit transmitter. The remote unit receiver can be configured to receive the signal from the base unit transmitter. The remote unit transmitter can be configured to transmit a vehicle start signal to a vehicle starting unit to start an engine of the vehicle.

The base unit can further include a base unit charging port, and the remote unit can further include a remote unit charging port. The base unit charging port and the remote unit charging port being engageable with each other to provide electrical communication therebetween.

Still further, the base unit can include a support bracket, and the remote unit can include a clip, with the support bracket being configured to receive at least a portion of the clip.

The support bracket can include at least one base unit stop wall extending laterally from a top planar surface of the base unit, and a base unit retaining wall extending from the base unit stop wall in a directional substantially parallel with the top planar surface to define a pocket.

The clip can include at least one remote unit stop wall extending laterally from a back planar surface of the remote unit, and a remote unit retaining wall extending from the remote unit stop wall in a directional substantially parallel with the back planar surface.

Even still further, the base unit charging port can be at least one base unit electrical connection with a portion of the base unit electrical connection in communication with the pocket. The remote unit charging port can be at least one remote unit electrical connection associated with the clip. The base unit electrical connection and the remote unit electrical connection can be configured to contact each other when the clip is received in the pocket.

The present invention holds significant improvements and serves as a remote vehicle starter and appliance activation system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, remote vehicle starter and appliance activation system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a remote vehicle starter system and more particularly to a remote vehicle starter and appliance activation system as used to improve the remotely starting a vehicle's engine and appliance at a programmed time.

Generally speaking, the present invention is a system and method for simultaneously remotely starting a vehicle's engine by way of a remote unit and turning on an appliance both at a programmed and/or predetermined time. The appliance can be any peripheral appliance such as, but not limited to, a coffee maker, a television, a radio, etc.

Figure 1:
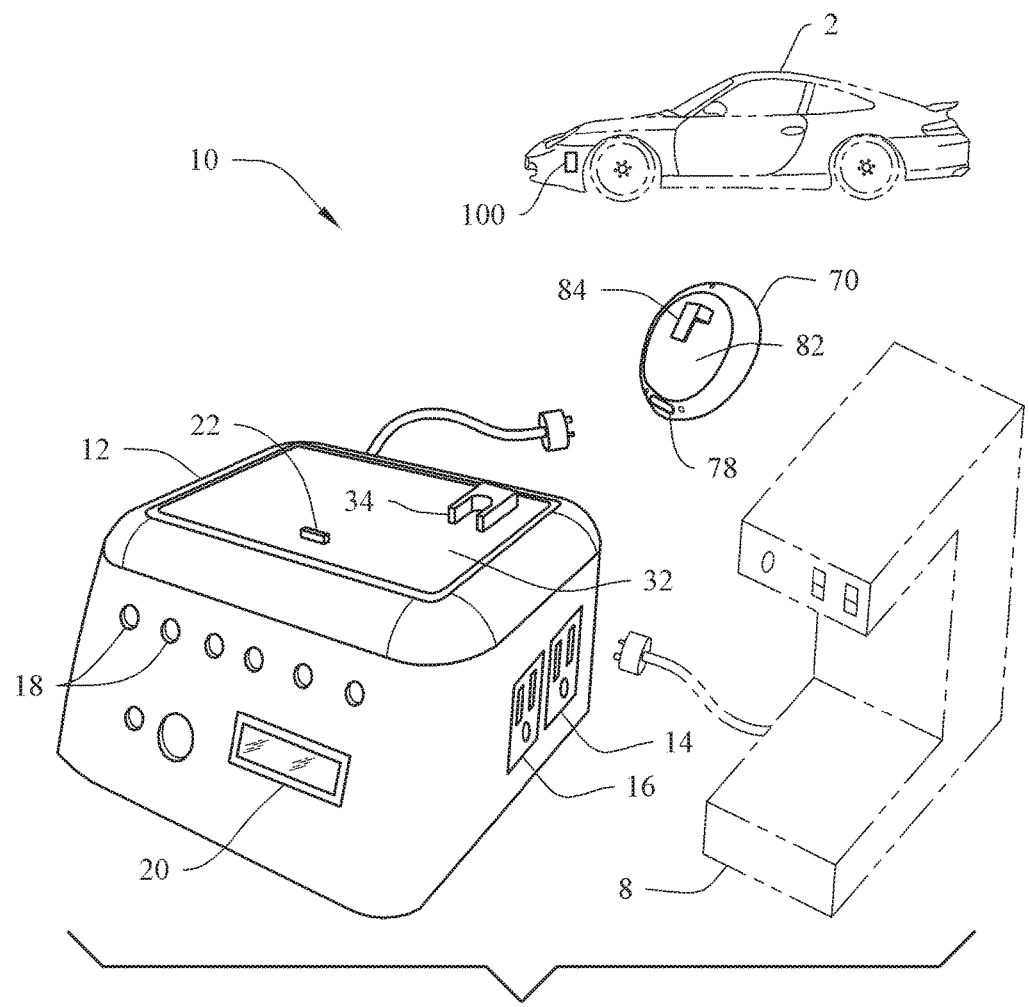
FIG. 1 shows a perspective view illustrating a remote vehicle starter and appliance activation system according to an embodiment of the present invention.

Referring to the drawings by numerals of reference there is shown in FIG. 1, a remote vehicle starter and appliance activation system 10 having a base unit 12, a remote unit 70, and a remote vehicle starting unit 100 associated with a vehicle 2. The remote unit 70 is controlled by the base unit 12, and the remote vehicle starting unit 100 is controlled by the remote unit 70, with an appliance 8 being activated by the base unit 12.

The base unit 12 can include an injection molded housing including one or more power outlets 14, 16, one or more control inputs 18, at least one display 20, a base unit charging port 22, and a support bracket 34. The base unit charging port 22 and support bracket 34 can be located on a top planar surface 32.

The remote unit 70 can include an injection molded housing including a remote unit charging port 78, a back planar surface 82, and a clip 84. The remote unit charging port 78 can have a configuration capable of engaging and electrically communicating with the base unit charging port 22 of the base unit 12. The clip 84 can have a configuration capable of engaging with the support bracket 34 of the base unit 12. The remote unit 70 is capable of receiving a signal from the base unit 12, and is capable of transmitting a signal to the remote vehicle starting unit 100.

The remote vehicle starting unit 100 is located and associated with the vehicle 2 and is configured to remotely start an engine of the vehicle 2 upon receipt of a signal from the remote unit 70.

At least one appliance 8 can be plugged into one of the power outlets 14, 16 of the base unit 12. The appliance 8 can be, but not limited to, a coffee maker, a television, a radio, etc., and the appliance 8 can be activated or turned on by the base unit 12 by supplying power to the corresponding power outlet 14, 16.

Figure 2:
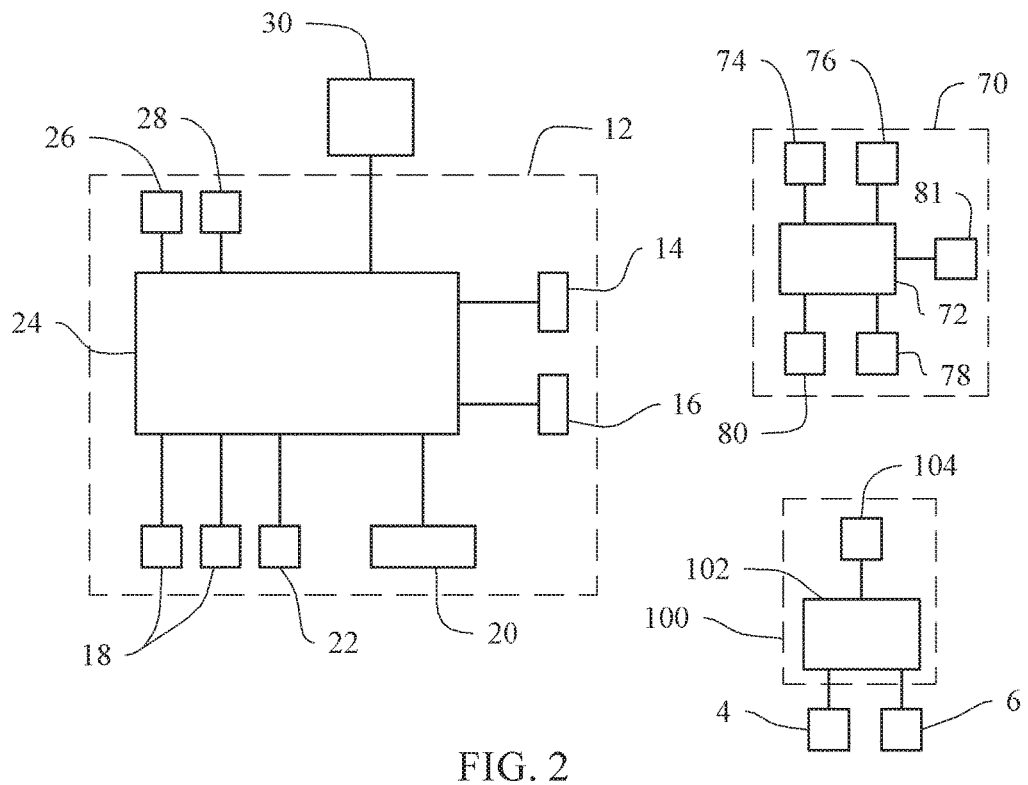
FIG. 2 is a schematic representation illustrating of the remote vehicle starter and appliance activation system according to an embodiment of the present invention of FIG. 1.

Referring now to FIG. 2, the base unit 12 can further include a central processing module 24 in communication with a power source 30, a display 20 in communication with the central processing module 24, at least one base unit transmitter 26 in communication with the central processing module 24, and a short distance transceiver 28 in communication with the central processing module 24. The short distance transceiver 28 can be Bluetooth® wireless technology. The one or more control inputs 18 are in communication with the central processing module 24, and the base unit charging port 22 is in communication with the central processing module 24.

The remote unit 70 can an further include a remote unit central processing module 72 in communication with at least one remote unit power source 80, at least one remote unit receiver 74 in communication with the remote unit central processing module 72, at least one remote unit transmitter 76 in communication with the remote unit central processing module 72, and at least one remote unit input 81 such as, but not limited to, buttons and/or keypad. The remote unit charging port 78 is in communication with the remote unit central processing module 72.

It can be appreciated that a user can input a frequency signal code associated with an aftermarket remote vehicle starting unit 100 into the remote unit central processing module 72 via the remote unit input 81. This allows the user to program the remote unit 70 to communicate with and control any remote vehicle starting unit 100. It can further be appreciated that the remote unit central processing module 72 can be operated in a search mode to sequentially transmit a plurality of frequency signals to the remote vehicle starting unit 100 until a corresponding operational signal is chosen and then such signal is saved and programmed into the remote unit central processing module 72.

The remote unit receiver 74 is configured to receive signals from the base unit transmitter 26 of the base unit 12. The remote unit transmitter is configured to wirelessly transmit signals to a vehicle receiver 104 of the remote vehicle starting unit 100. The remote unit power source 80 can be, but not limited to, a rechargeable battery capable of being recharged/charged by way of the remote unit charging port 78 when in electrical communication with the base unit charging port 22 of the base unit 12.

The remote vehicle starting unit 100 can include a vehicle central processing module 102 in communication with the vehicle receiver 104, a vehicle battery 4 and a vehicle starting means 6. The vehicle receiver 104 is configured to receive signals from the remote unit transmitter 76. The vehicle starting means 6 can be, but not limited to, a vehicle engine starter and/or a vehicle computer system that controls the vehicle engine starter. The vehicle central processing module 102 is configured to activate and/or providing a starting signal the vehicle starting means 6 upon receiving an appropriate signal from the remote unit transmitter 76.

The central processing modules 24, 72 and 102 can each include electronical components such as, but not limited to, at least one processor, at least one interface, at least one readable media unit or memory, at least one bus, and at least one computer program product stored on the readable memory including instructions for execution by the processor. Each processor can perform the computation and control functions of the central processing modules 24, 72 and 102, and may comprise any type of processor or multiple processors, single integrated circuits such as a microprocessor, or any suitable number of integrated circuit devices and/or circuit boards working in cooperation to accomplish the functions of the central processing modules 24, 72 and 102, respectively. During operation, each processor executes one or more programs contained within the corresponding memory and, as such, controls the general operation of the central processing modules 24, 72 and 102 and the computer system of the central processing modules 24, 72 and 102, preferably in executing the steps of the processes described herein.

Figure 3:
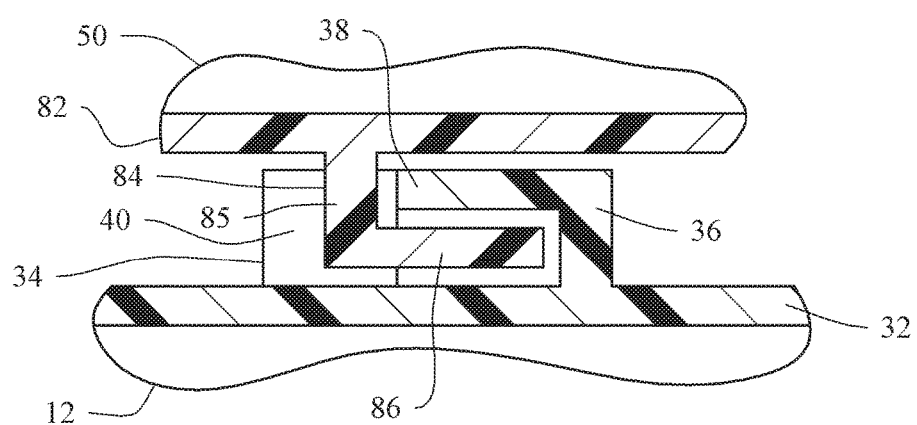
FIG. 3 is a cross-sectional view of the support bracket and clip according to an embodiment of the present invention of FIG. 1.

Referring now to FIG. 3, the support bracket 34 can include at least one stop wall 36 extending laterally from the top planar surface 32, and a retaining wall 38 extending from the stop wall 36 in a directional substantially parallel with the top planar surface 32 thereby defining a cavity or pocket 40. It can be appreciated that the support bracket 34 can include additional walls extending laterally from the top planar surface 32 and adjacent to the stop wall 36 to further define the pocket 40.

The clip 84 can include at least one remote unit stop wall 85 extending laterally from the back planar surface 82, and a remote unit retaining wall 86 extending from the remote unit stop wall 85 in a directional substantially parallel with the back planar surface 82 thereby defining a clip-like configuration.

The pocket 40 and the clip 84 are configured so that the remote unit retaining wall 86 is receivable in the pocket 40 with either a distal end of the remote unit retaining wall 86 capable of abutting against the stop wall 36 and/or a distal end of the retaining wall 38 capable of abutting against the remote unit stop wall 85.

It can be appreciated that the base unit 12 can be mounted on a horizontal or vertical surface lending the support bracket 34 to support the remote unit 70 horizontally or hang the remote unit 70, respectively.

Figure 4:
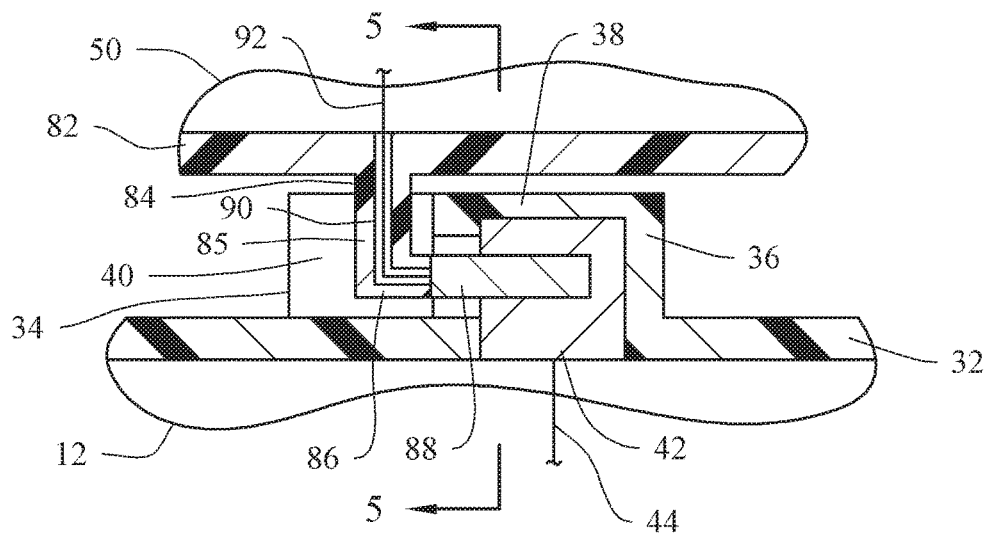
FIG. 4 is a cross-sectional view of the support bracket and clip including the electrical connection according to an embodiment of the present invention of FIG. 1.
Figure 5:
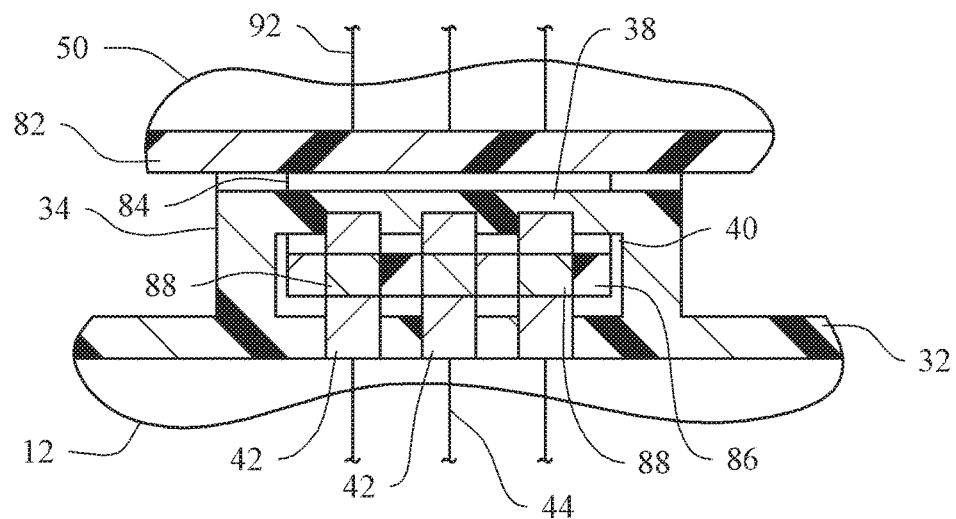
FIG. 5 is a cross-sectional view of the support bracket and clip including the electrical connection assembly taken along line 5-5 of FIG. 4.

Referring now to FIGS. 4 and 5, the charging ports 22, 78 can be associated with the support bracket 34 and the clip 84 by way of engageable electrical connections. It can be appreciated that these engageable electrical connections can be provided in combination with the charging ports 22, 78. The support bracket 34 can include at least one base unit electrical connection 42 located within the pocket 40, and in communication with the central processing module 24 via a wire or wiring assembly 44. The base unit electrical connection 42 can have, but not limited to, a C-shaped configuration, a cylindrical configuration, a biasing element, a locking element, a threaded element, a plug, a receiving channel or a post element. The base unit electrical connection 42 can be located adjacent the stop wall 36, with a portion of the base unit electrical connection 42 received in a recess defined in the retaining wall 38, and another portion received through the top planar surface 32.

The clip 84 can include at least one remote unit electrical connection 88 located on or at a distal end of the remote unit retaining wall 86. The remote unit electrical connection 88 is in communication with the remote unit central processing module 72 via a wire or wiring assembly 92. The remote unit stop wall 85 and/or the remote unit retaining wall 86 can include a channel 90 defined therein or therethrough capable of receiving the wire 92. The remote unit electrical connection 88 can have a configuration capable of being received in or in contact with the base unit electrical connection 42 so that the central processing module 24 and the remote unit central processing module 72 can communicate with each other.

It can be appreciated that when the clip 84 is received in the pocket 40 of the support bracket 34, the base unit electrical connection 42 and the remote unit electrical connection 88 are in contact. This allows the remote unit central processing module 72 to receive instructional signals and/or power from the base unit 12, thereby creating a combined communication and charging port.

The system 10 may be sold as kit comprising the following parts: the base unit 12 the remote unit 70; the remote vehicle starting unit 100; and at least one set of user instructions. It can be appreciated that the kit can be provided without the remote vehicle starting unit 100, with the remote unit 70 capable of being programmed to communicate with any installed or aftermarket remote vehicle starting system. The kit has instructions such that functional relationships are detailed in relation to the structure of the invention (such that the invention can be used, maintained, or the like in a preferred manner).

The system 10 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

In use it can be appreciated that a user can program the remote unit 70 with a frequency code that is associated with the remote vehicle starting unit 100. The user can further program the base unit 12 to transmit a signal to the remote unit 70 at a predetermined time or times. The user can also plug at least one appliance 8 into one of the power outlets 14, 16.

When the predetermined time is reached, the base unit 12 can send the signal to the remote unit 70, which then sends a vehicle start signal to the remote vehicle starting unit 100. The remote vehicle starting unit 100 can then initiate a vehicle starting sequence which starts the vehicle's engine. Simultaneously with sending the signal to the remote unit 70, the base unit 12 also provides power to the power outlets 14, 16 at the predetermined time, thereby turning on any appliance 8 plugged into the power outlets 14, 16.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A remote vehicle starter and appliance activation system comprising:
    a base unit including at least one base unit transmitter, and at least one power outlet, said base unit transmitter being configured to transmit at least one signal at a predetermined time and to provide power to an appliance plugged into said power outlet at said predetermined time; and
    a remote unit including at least one remote unit receiver, and at least one remote unit transmitter, said remote unit receiver being configured to receive said signal from said base unit transmitter, said remote unit transmitter being configured to transmit a vehicle start signal to a vehicle starting unit;
    wherein said vehicle starting unit having a configuration capable of starting an engine of a vehicle associated with said vehicle starting unit.

2. The remote vehicle starter and appliance activation system of claim 1 wherein said base unit further includes a base unit charging port, said remote unit further includes a remote unit charging port, said base unit charging port and said remote unit charging port being engageable and in electrical communication with each other.

3. The remote vehicle starter and appliance activation system of claim 2 wherein said base unit further includes a support bracket, said remote unit further includes a clip, said support bracket has a configuration capable of receiving at least a portion of said clip.

4. The remote vehicle starter and appliance activation system of claim 3 wherein said support bracket includes at least one base unit stop wall, a base unit retaining wall, and a pocket defined in said support bracket.

5. The remote vehicle starter and appliance activation system of claim 4 wherein said base unit stop wall extends laterally from a top planar surface of said base unit, and said base unit retaining wall extends from said base unit stop wall in a directional substantially parallel with said top planar surface to define said pocket.

6. The remote vehicle starter and appliance activation system of claim 5 wherein said clip includes at least one remote unit stop wall, and a remote unit retaining wall.

7. The remote vehicle starter and appliance activation system of claim 6 wherein said remote unit stop wall extends laterally from a back planar surface of said remote unit, and said remote unit retaining wall extends from said remote unit stop wall in a directional substantially parallel with said back planar surface.

8. The remote vehicle starter and appliance activation system of claim 7 wherein said pocket has a configuration capable of receiving said portion of said clip, said portion being at least a section of said remote unit retaining wall.

9. The remote vehicle starter and appliance activation system of claim 8 wherein said base unit charging port is at least one base unit electrical connection with a portion of said base unit electrical connection in communication with said pocket.

10. The remote vehicle starter and appliance activation system of claim 9 wherein said remote unit charging port is at least one remote unit electrical connection associated with said clip.

11. The remote vehicle starter and appliance activation system of claim 10 wherein said portion of said base unit electrical connection and said remote unit electrical connection are configured to contact each other when said clip is received in said pocket.

12. The remote vehicle starter and appliance activation system of claim 2 wherein said base unit further includes at least one base unit central processing module, at least one display in communication with said base unit central processing module, at least one base unit input in communication with said base unit central processing module, said base unit transmitter being in communication with said base unit central processing module.

13. The remote vehicle starter and appliance activation system of claim 12 wherein said base unit central processing module being in communication with a power source and said base unit charging port.

14. The remote vehicle starter and appliance activation system of claim 13 wherein said remote unit further includes at least one remote unit central processing module, and at least one remote unit input in communication with said remote unit central processing module, said remote unit transmitter and said remote unit receiver each being in communication with said remote unit central processing module.

15. The remote vehicle starter and appliance activation system of claim 14 wherein said remote unit central processing module being in communication with a remote unit power source and said remote unit charging port.

16. The remote vehicle starter and appliance activation system of claim 15 wherein said vehicle starting unit includes at least one vehicle receiver, said vehicle receiver being configured to receive said vehicle start signal and to start an engine of a vehicle upon receipt of said vehicle start signal.

* * * * *